F. G. GIES AND E. R. LEWIS.
ARBOR PRESS.
APPLICATION FILED APR. 19, 1918.

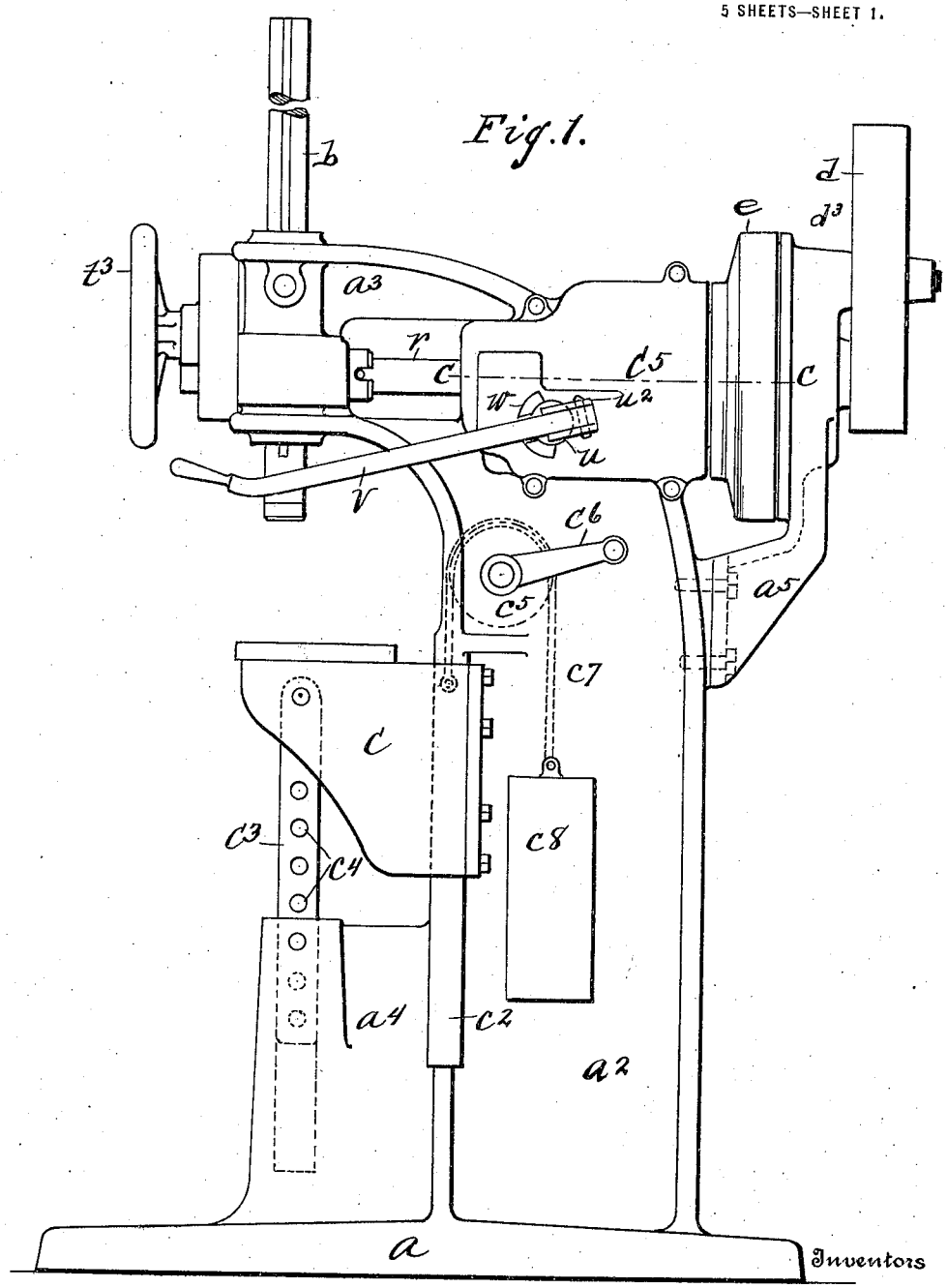

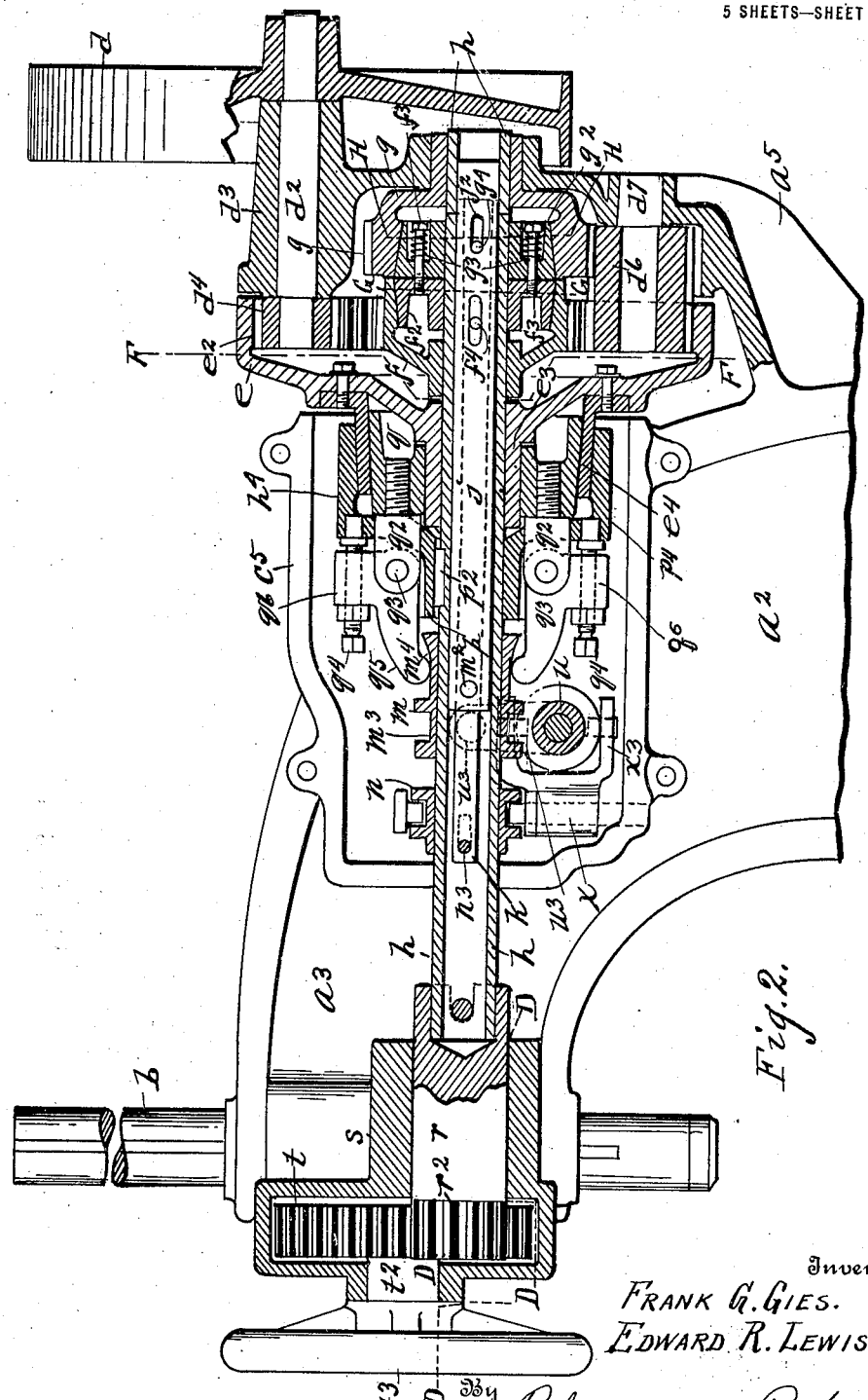

1,330,462.

Patented Feb. 10, 1920.
5 SHEETS—SHEET 3.

Inventors
Frank G. Gies.
Edward R. Lewis.
By Ralgemond A. Parker
Attorney

F. G. GIES AND E. R. LEWIS.
ARBOR PRESS.
APPLICATION FILED APR. 19, 1918.
1,330,462.
Patented Feb. 10, 1920.
5 SHEETS—SHEET 4.
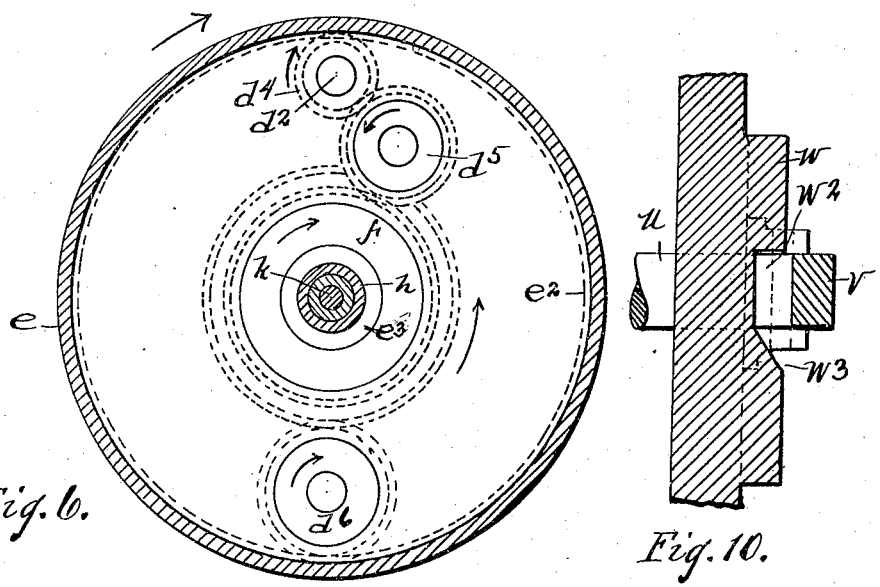
Fig. 6.
Fig. 10.
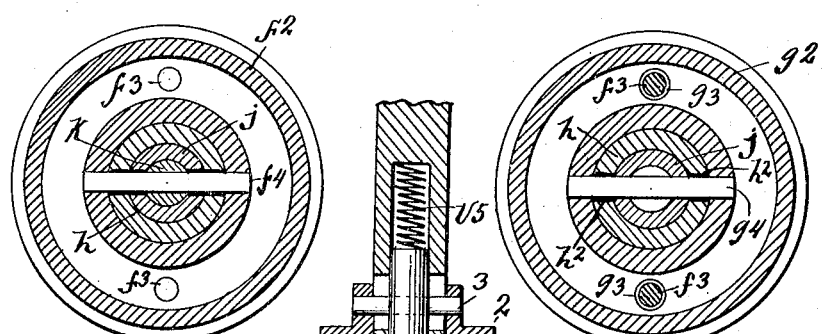
Fig. 7.
Fig. 8.
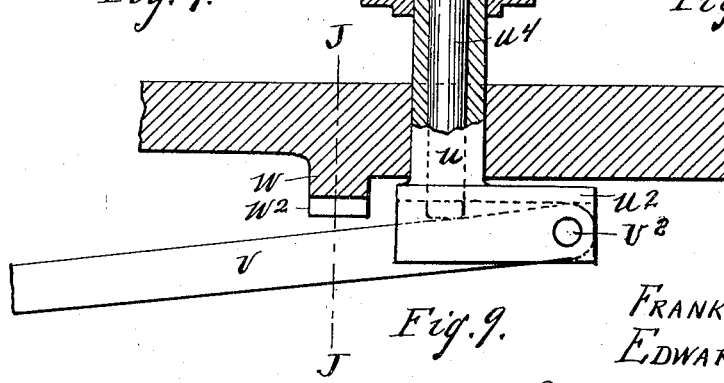
Fig. 9.
Inventors
FRANK G. GIES.
EDWARD R. LEWIS.
By Ralzemond A. Parker
Attorney F. G. GIES AND E. R. LEWIS.
ARBOR PRESS.
APPLICATION FILED APR. 19, 1918.
1,330,462.
Patented Feb. 10, 1920.
5 SHEETS—SHEET 5.
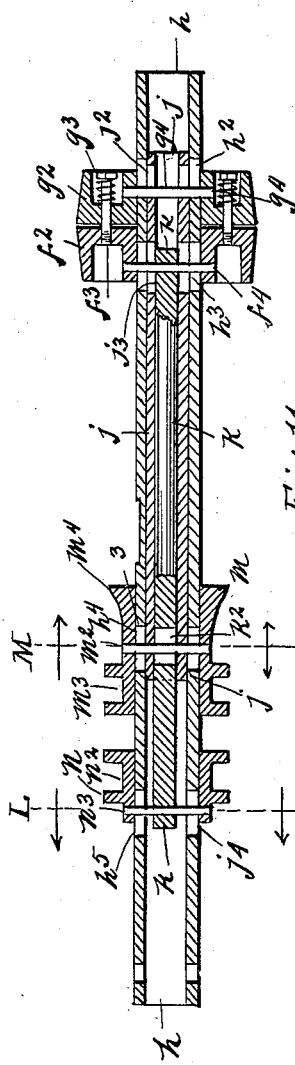
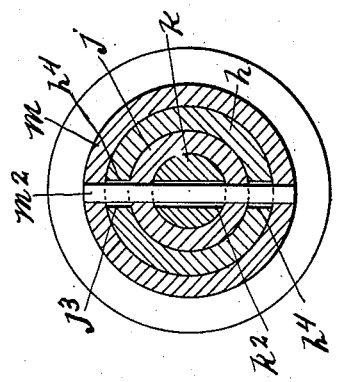
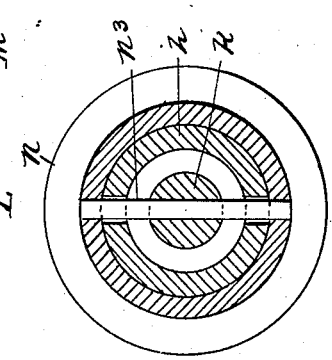
Inventors.
FRANK G. GIES.
EDWARD R. LEWIS
By Ralzemond A. Parker
Attorney

UNITED STATES PATENT OFFICE.

FRANK G. GIES AND EDWARD R. LEWIS, OF DETROIT, MICHIGAN, ASSIGNORS, BY MESNE ASSIGNMENTS, TO HERCULES MACHINERY COMPANY, OF DETROIT, MICHIGAN, A CORPORATION.

ARBOR-PRESS.

1,330,462.  Specification of Letters Patent.  Patented Feb. 10, 1920.

Application filed April 19, 1918. Serial No. 229,539.

*To all whom it may concern:*

Be it known that we, FRANK G. GIES and EDWARD R. LEWIS, both citizens of the United States, residing at Detroit, county of Wayne, State of Michigan, have invented a certain new and useful Improvement in Arbor-Presses, and declare the following to be a full, clear, and exact description of the same, such as will enable others skilled in the art to which it pertains to make and use the same, reference being had to the accompanying drawings, which form a part of this specification.

Our invention relates to arbor presses and an object of our improvements is to provide an improved machine for forcing arbors in place in machinery under construction.

We secure this object in the machine illustrated in the accompanying drawings in which;

Figure 1 is an elevation of a machine embodying our invention.

Fig. 2 is a vertical axial section of the upper part of the machine to an enlarged scale.

Fig. 6 is a detail section showing the transmission gearing at the right of Fig. 2, parts being broken away to permit a view of the gearing.

Fig. 7 is a section on the line G—G Fig. 2.

Fig. 8 is a section on the line H—H Fig. 2.

Fig. 9 is a detail partly in section showing the hand lever and the apparatus actuated thereby by which the various clutch connections are made.

Fig. 10 is a section on the line J—J Fig. 9.

Fig. 11 is a detail sectional view of the operating spindle, the section being taken in a horizontal plane through the center of the spindle.

Fig. 12 is a detail sectional view on the line L—L Fig. 11, and

Fig. 13 is a detail sectional view on the line M—M Fig. 11.

$a$ is the base from which rises vertically a standard $a^2$ which curves at its upper end to a horizontal position forming a goose neck $a^3$. $a^4$ is a short projection in the standard $a^2$ which also rises from the base $a$. $c^2$ indicates a way at the side of the standard $a^2$. $c$ is a movable supporting piece adapted to travel on the way $c^2$ and balanced by a weight $c^8$ with which it is connected by a chain $c^7$ passing over a pulley $c^5$. There is a crank $c^6$ by which the pulley $c^5$ may be rotated to adjust the position of the supporting piece $c$. $c^3$, is a pitman, or sliding rod, pivoted at its upper end to the supporting piece $c$ beneath the work receiving portion of said supporting piece and extending vertically downward into an aperture in the projection $a^4$. The rod, or pitman, $c^3$ is provided with transverse holes $c^4$ and a corresponding hole is formed through the walls of the aperture in which said rod or pitman reciprocates. The table $c^4$ is adjusted to the desired position and a pin is inserted through that one of the holes $c^4$ which registers with the holes in the wall of said aperture.

Figure 5:
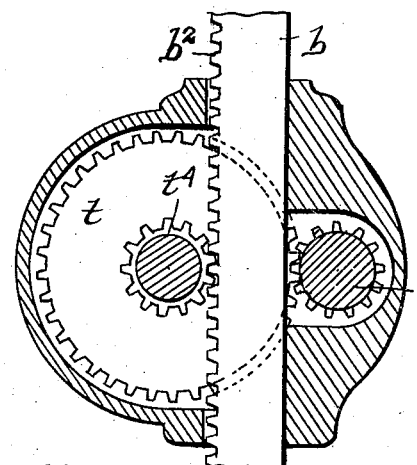
Fig. 5 is a detail showing the parts of Fig. 4 looking from the right of said figure, the casing being partly broken away on the line E—E and the hand wheels removed.
Figure 4:
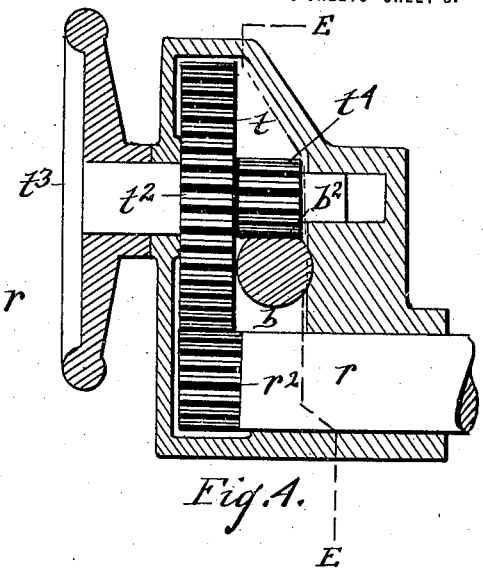
Fig. 4 is a detail section on about the line D—D—D—D Fig. 2.

$d$ represents a wheel through which power is imparted to the machine by means of a belt or otherwise. The wheel $d$ is mounted upon a shaft $d^2$ (Fig. 2) which is supported in a rigid bearing $d^3$ in a bracket $a^5$ secured to the standard $a^2$ and extending laterally and upwardly therefrom. $d^4$ is a pinion on the inner end of the shaft $d^2$. $h$ is a hollow spindle supported to rotate on the frame of the machine. The left hand end of the spindle $h$ is jointed to a stub spindle $r$ which has a pinion $r^2$ at its left hand end. The stub spindle $r$ rests in a bearing $s$ at the outer end of the goose-neck $a^3$. $b$ is a bar adapted to reciprocate vertically in a bearing at the outer end of the goose-neck $a^3$ and being provided with a rack $b^2$ (Fig. 4). $t^2$ is an arbor having a gear wheel $t$ at its inner end and a hand wheel $t^3$ at its outer end. The pinion $r^2$ engages the gear wheel $t$. $t^4$ is a pinion rigidly connected with the gear wheel $t$ concentric thereto, its teeth engaging the rack teeth $b^2$ on the reciprocating bar $b$.

It will be seen that by rotating the spindle $h$ and stub spindle $r$ the bar $b$ may be moved by means of the pinion $r^2$, gear wheel $t$, pinion $t^4$ and rack $b^2$, or if the parts are otherwise free to move, the bar $b$ may be adjusted to any desired vertical position by rotating the wheel $t^3$ by hand.

$e$ is a gear wheel having internal gear teeth $e^2$ and a hub $e^3$ fitting and adapted to turn upon the spindle $h$. $e^4$ is a conical annular flange secured to the wheel $e$ concentric therewith and extending from the web of said wheel.

$p$ is an annulus sleeved upon the spindle $h$ and secured thereto by a key, or feather, $p^2$ which permits of a motion of the annulus longitudinally of the spindle but restrains relative angular movement. $p^4$ is a cylindrical portion of the annulus $p$ extending over the flange $e^4$ on the internal gear wheel $e$ and having its internal face shaped to, and adjacent, or contiguous, to the exterior surface of said flange. $q$ is a clutch piece adapted to be engaged with and disengaged from the interior surface of the flange $e^4$. $q^2$ indicates lugs which extend from the clutch piece $q$ through apertures in the annulus $p$ so that there may be relative motion of said clutch piece and annulus axially of the spindle $h$ but no relative angular movement. There are bell crank levers pivoted at $q^3$ to lugs extending from the clutch member $q$ and having outwardly extending arms $q^6$ which bear, through an adjustable screw $q^4$, upon the vertical face of the part $p^4$ of the annulus $p$.

There is a sleeve $m$ adapted to slide upon the spindle $h$ longitudinally thereof and provided with a groove $m^3$ and a conical cam surface $m^4$. The bell crank levers pivoted to the lug $q^2$ of the clutch piece $q$ have arms $q^5$ extending to the exterior surface of the sleeve $m$ and adapted to engage the cam surface $m^4$ thereon.

The internal gear wheel $e$ is adapted to turn freely upon the spindle $h$ except when clamped thereto by the mechanism just above described. By moving the sleeve $m$ toward the left the cam surface $m^4$ actuates the bell crank levers to draw the clutch piece $q$ into engaging position against the flange $e^4$ which binds the wheel $e$ to the annulus $p$ and thus to the spindle $h$. The motion of the wheel $d$ and shaft $d^2$ will then be imparted to the wheel $e$ through the pinion $d^4$ (Fig. 6) and internal gear teeth $e^2$ so as to give a slow downward movement to the bar $b$ at a very powerful leverage.

There is a gear wheel $f$ sleeved and adapted to turn upon the spindle $h$ and having exterior gear teeth and an outwardly flaring internal conical clutch surface. The pinion $d^4$ is geared to the pinion $f$ through an intermediate gear wheel $d^5$ (Fig. 6) so that the motion of said pinion is imparted to the wheel $f$.

There is a gear wheel $g$ similar to the gear wheel $f$ and having a face adjacent thereto. The gear wheel $g$ has exterior gear teeth and an outwardly flaring internal clutch surface. The wheel $g$ is also sleeved upon the spindle $h$ and adapted to turn thereon. $d^6$ (Fig. 6) is a gear wheel, the teeth of which gear directly with the internal gear teeth $e^2$ and exterior gear teeth of the wheel $g$. The motion of the pinion $d^4$ is communicated to the interior gear wheel $e$ and from that through the gear wheel $d^6$ to the gear wheel $g$.

It will be observed that the direction of rotation of the wheel $g$ is opposite to that of the wheel $f$.

$f^2$ is a clutch part adapted to engage and be disengaged from the interior surface of the wheel $f$, and $g^2$ is a similar clutch part adapted to coöperate with the internal surface of the gear wheel $g$. There are bolts $f^3$ extending from the clutch part $f^2$ through apertures in the clutch part $g^2$ and having springs $g^3$ threaded thereon adapted to yieldingly hold the clutch parts $f^2$ $g^2$ with their inner faces contiguous.

The clutch parts $f^2$ and $g^2$ are adapted to slide longitudinally upon the spindle $h$ but are restrained from angular motion relative thereto.

When the clutch part $f^2$ engages the wheel $f$ a rapid downward motion will be imparted to the bar $b$. When the clutch $g^2$ engages the gear wheel $g$ the gear wheel $f$ will be released and a rapid upward motion will be imparted to the spindle $h$.

There is a sleeve $j$ (Fig. 11) fitting and adapted to reciprocate within the spindle $h$. The sleeve $m$ is rigidly secured to the left hand end of the sleeve $j$ by a pin $m^2$ which is fixed in said sleeve at its ends, passes through slots $h^4$ in the spindle $h$ and is fixed in the walls of the sleeve $j$.

There is a pin $g^4$ fixed in the clutch piece $g^2$ extending through slots $h^2$ in the wall of the spindle $h$ and through slots $j^2$ in the wall of the sleeve $j$.

In the normal position of the parts the pin $g^4$ engages the walls of the slots $j^2$ at the left hand end of said slots. If the sleeve $m$ is moved toward the right, as shown in the figures, the sleeve $j$ will act on the pin $g^4$ to move the clutch piece $g^2$ into engagement with the gear wheel $g$ so as to cause the fast upward movement of the bar $b$. If the sleeve $m$ is moved to the left it will disengage the pin $g^4$ permitting the disengagement of the clutch part $g^2$.

A further movement to the left of the sleeve $m$ will leave the pin $g^4$ free because of the relative position of the slots $j^2$ and will cause the engagement of the gear wheel $e$ with the spindle $h$ as above described.

$k$ is a rod fitting within the sleeve $j$ and adapted to reciprocate therein. The right hand end of the rod $k$ is connected by a pin $f^4$, passing freely through slots in the sleeve $j$ and spindle $h$, with the clutch part $f^2$. A movement of the rod $k$ toward the left will move the clutch part $f^2$ into engagement with the wheel $f$ thus binding the wheel to the spindle $h$ and causing the fast downward movement of the bar $b$.

$u$ (Figs. 2 and 9) is an arbor or rock shaft pivoted in bearings in the frame of the machine and extending in a direction at right angles to that of the spindle $h$ beneath the groove $m^3$ in the sleeve $m$. The arbor $u$ is provided with yokes $u^3$ which extend upwardly therefrom and engage by means of the usual cylindrical pins in the groove $m^3$ on the sleeve $m$.

By rotating the arbor $u$ to the right the sleeve $m$ is moved in that direction to engage the clutch part $q^2$ with the gear wheel $g$; by rotating said arbor in the opposite direction the sleeve $m$ is moved to the left to cause the engagement of the clutch part $q$ binding the wheel $e$ to the spindle $h$.

Figure 3:
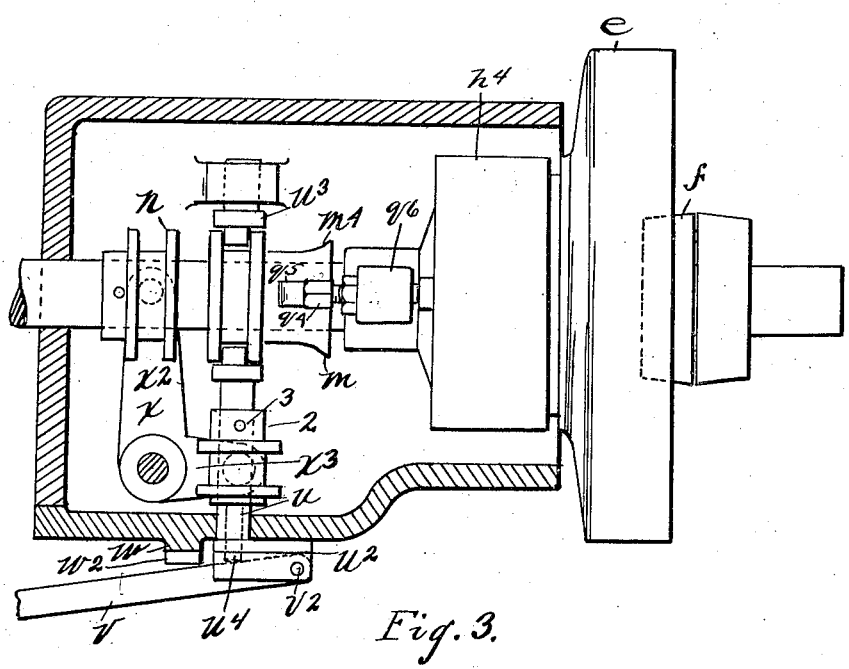
Fig. 3 is a detail plan view, the casing being in section, on the line C—C Fig. 1.

Upon the arbor $u$ there is a grooved sleeve 2 (Fig. 3) adapted to reciprocate on said arbor; and within an axial opening in the arbor $u$, there is a rod $u^4$ adapted to fit and reciprocate longitudinally therein. There is a spring $u^5$ (Fig. 9) acting to press the rod $u^4$ to the outer limit of its travel. There is a pin 3 extending through slots in the walls of the arbor $u$ and engaging the sleeve 2 with the rod $u^4$.

$x$ (Fig. 3) is a bell crank lever pivoted upon a vertical pivot and having an arm $x^3$ extending and engaging in the groove of the sleeve 2, and an arm $x^2$ extending under the sleeve $n$ and engaging by a pin in the groove of said sleeve.

There is a crank piece $u^2$ secured to the outer end of the arbor $u$ and provided with a radially extending groove opening outward. Within the groove in the crank piece $u^2$ is pivoted at $v^2$ a lever arm $v$. The rod $u^4$ extends at its outer end into the groove in the crank piece $u^2$ and may be engaged by the inner edge of the lever arm $v$. By raising the lever arm $v$ up or down the crank piece $u^2$ is actuated to oscillate the arbor $u$.

There is a quadrant flange $w$ formed upon the casing of the machine over which quadrant the lever arm $v$ travels. The quadrant $w$ is provided with a notch $w^2$ (Fig. 10), the lower wall $w^3$ of which slants outwardly. When the lever arm $v$ comes opposite the notch or groove $w^2$ it may be turned inward about its pivot $v^2$ thus actuating the reciprocating rod $u^4$, the sleeve 2, the bell crank lever $x$, forcing the sleeve $n$ toward the left and drawing the clutch piece $f^2$ into engagement with the gear wheel $f$ to the spindle $h$ and causing the fast downward movement of the bar $b$.

The operation of the above described device is as follows:

The work is placed upon the bed plate at the upper surface of the supporting piece $c$ and said piece is adjusted by means of the crank $c^6$ to a convenient position and fixed therein by inserting a locking pin through one of the holes $c^4$. The handle $v$ is then moved into the slot $w^2$ in the quadrant $w$ thus causing the rapid downward movement of the bar $b$ until the lower end of said bar is nearly or quite in contact with the work to be operated upon. The lever arm $v$ is then pushed downward which, because of the slanting wall $w^3$, forces it out of the groove $w$, turns the arbor $u$ so as to move the sleeve $m$ toward the left thus engaging the internal gear wheel $e$ with the spindle $h$ and securing the slow downward movement with a great leverage above described, thus forcing the arbor into position.

By raising the lever arm $v$ to its normal or approximately horizontal position, the power is disengaged and the bar $b$ comes to rest. By raising the lever arm $v$ upward, the sleeve $m$ is moved toward the right thus moving the clutch piece $g^2$ by means of the sleeve $j$ into engagement with the gear wheel $g$ so as to secure the fast downward movement of the bar $b$. When the bar is sufficiently raised to leave room for the withdrawal of the work the lever arm $v$ is moved backward to its normal position opposite the slot or notch $w^2$ in the quadrant $w$ and the parts are disengaged and the bar $b$ comes to rest. In this position the bar $b$ may be adjusted to any position by the hand wheel $d^3$.

It will be noted that the movements of the lever are in the natural directions. For instance, if the operator desires to raise the bar $b$ he raises the lever arm, having adjusted the work to position and wishing to bring the bar $b$ down into the neighborhood of the work without actually operating upon it, which is an unusual and auxiliary operation, he moves the lever arm laterally. Having got the bar $b$ into position to begin its forcible operation by the slow movement downward at a considerable leverage he merely presses the lever arm down in the direction he wishes the bar to go, the slanting edge of the slot in the quadrant $w$ moving the lever laterally out of the slot.

What we claim is:

1. In an apparatus of the kind described, a reciprocating presser bar, a spindle, means whereby said spindle shall actuate said bar, a power shaft, means for imparting a fast motion from said shaft to said spindle in one direction, means for imparting a fast motion from said shaft to said spindle in the other direction, means for imparting a slow motion from said shaft to said spindle in one direction, and a single lever adapted to throw one or the other of said motion transmitting means into operation.

2. In an apparatus of the kind described, a reciprocating presser bar, a spindle, means whereby said spindle actuates said bar, a power shaft, means for imparting a fast motion from said shaft to said spindle in one direction, means for imparting a fast motion from said shaft to said spindle in the other direction, and means for imparting a slow motion from said shaft to said spindle in one direction, and a lever having three directions of motion, each of said directions being adapted to throw into operation one of said transmission means.

3. The combination of a spindle, a wheel sleeved and adapted to turn on said spindle and having a concentric conical flange, a piece keyed on said spindle and adapted to slide longitudinally thereon and having a conical surface within said flange adapted to engage the inner surface of said flange, a second piece concentric with said flange and having a conical inner surface adapted to engage the outer surface of said flange, said pieces being restrained from relative angular motion but adapted to slide angularly with reference to each other, and a lever pivoted upon one of said pieces and engaging the other of said pieces, for the purpose described.

4. In an apparatus of the kind described, a reciprocating presser bar, a power shaft, apparatus for connecting said power shaft to said bar to cause a rapid upward motion, means for connecting said power shaft with said bar to cause a slow downward motion, and means for connecting said power shaft to said bar to cause a fast downward motion, a lever arm, said lever arm being adapted to connect the mechanism for producing a fast upward motion of said bar when said lever arm is raised and a slow downward movement of said bar when said lever arm is lowered, and a fast downward movement of said arm when said lever arm is moved laterally.

5. In an apparatus of the kind described, a reciprocating presser bar, a power shaft, apparatus for connecting said power shaft to said bar to cause a rapid upward motion, means for connecting said power shaft with said bar to cause a slow downward motion, and means for connecting said power shaft to said bar to cause a fast downward motion, a lever arm, said lever arm being adapted to connect the mechanism for producing a fast upward motion of said bar when said lever arm is raised and a slow downward movement of said bar when said lever arm is lowered, and a fast downward movement of said arm when said lever arm is moved laterally, a quadrant over which said lever arm travels, said quadrant being provided with a notch into which said lever arm passes in said lateral motion, the lower wall of said notch being slanted for the purpose described.

6. In an apparatus of the kind described, a rock shaft $u$, a lever arm adapted to rock said shaft, said arm being pivoted to said shaft so as to turn about its pivot in a plane parallel to the axis of said shaft, a pivoted lever arm having its pivotal axis at right angles to a plane through the axis of said shaft, the first named lever arm being adapted to turn the last named lever arm about its pivot when the first named lever arm is turned about its pivot on said shaft.

7. In an apparatus of the kind described, the combination of a spindle, an internal gear wheel sleeved and adapted to turn upon said spindle, a driving pinion engaging the teeth of said gear wheel, a gear wheel having external teeth sleeved upon said spindle, said pinion being connected with the last named gear wheel by intermediate gearing, a clutch adapted to engage each of said gear wheels with said spindle, and means within said spindle for operating each of said clutches.

8. In an apparatus of the kind described, the combination of a spindle, an internal gear wheel sleeved and adapted to turn upon said spindle, a driving pinion engaging the teeth of said gear wheel, a gear wheel having external teeth sleeved upon said spindle, said pinion being connected with the last named gear wheel by intermediate gearing, a clutch adapted to engage each of said gear wheels with said spindle, and means within said spindle for operating each of said clutches, a second gear wheel having external gear teeth, a gear wheel engaging with the teeth of said internally toothed gear wheel and the last named externally toothed gear wheel, a clutch mechanism for uniting the last named externally toothed gear wheel with said spindle, and means within said spindle for engaging the last named externally toothed gear wheel with said spindle.

9. In an apparatus of the kind described, a spindle, an internally toothed gear wheel sleeved and adapted to turn upon said spindle, two externally toothed gear wheels sleeved and adapted to turn on said spindle, a driving pinion engaging the teeth of the internally toothed gear wheel, an intermediate gear wheel engaging the teeth of said pinion and one of said externally toothed gear wheels, a gear wheel having its teeth engaging the teeth of the internal gear wheel and the teeth of the other external gear wheel, and means for connecting one or the other of said gear wheels with said spindle.

In testimony whereof, we sign this specification.

FRANK G. GIES.
EDWARD R. LEWIS.